US007831920B2

(12) United States Patent
Hillis et al.

(10) Patent No.: US 7,831,920 B2
(45) Date of Patent: Nov. 9, 2010

(54) METHOD AND APPARATUS FOR UTILIZING PRESCRIBED ASPECT(S) OF FEEDBACK OBJECT SELECT OPERATION TO INDICATE USER FEEDBACK OF HYPERMEDIA CONTENT UNIT

(75) Inventors: W. Daniel Hillis, Encino, CA (US); Bran Ferren, Beverly Hills, CA (US); Daniel Abrutyn, Los Angeles, CA (US)

(73) Assignee: Applied Minds, Inc., Glendale, CA (US)

( * ) Notice: Subject to any disclaimer, the term of this patent is extended or adjusted under 35 U.S.C. 154(b) by 0 days.

(21) Appl. No.: 12/424,496

(22) Filed: Apr. 15, 2009

(65) Prior Publication Data

US 2009/0249230 A1 Oct. 1, 2009

Related U.S. Application Data

(63) Continuation of application No. 11/186,574, filed on Jul. 20, 2005, now Pat. No. 7,568,163.

(51) Int. Cl.
*G06F 3/048* (2006.01)

(52) U.S. Cl. .................. 715/764; 715/856; 715/708; 715/832; 715/837

(58) Field of Classification Search .............. 715/764, 715/708, 832, 837, 856
See application file for complete search history.

(56) References Cited

U.S. PATENT DOCUMENTS

| | | | |
|---|---|---|---|
| 5,691,580 A * | 11/1997 | Shelby | 307/119 |
| 5,986,656 A | 11/1999 | Crutcher et al. | |
| 6,421,724 B1 * | 7/2002 | Nickerson et al. | 709/224 |
| 6,750,889 B1 | 6/2004 | Livingston | |
| 7,222,156 B2 | 5/2007 | Gupta et al. | |
| 2002/0056091 A1 * | 5/2002 | Bala et al. | 725/34 |
| 2004/0103148 A1 | 5/2004 | Aldrich | |
| 2006/0047663 A1 * | 3/2006 | Rail | 707/10 |
| 2007/0005285 A1 * | 1/2007 | Owens et al. | 702/118 |
| 2008/0301149 A1 * | 12/2008 | Malcolm | 707/10 |
| 2010/0042718 A1 * | 2/2010 | Morris | 709/224 |

OTHER PUBLICATIONS

Sun Microsystems, Inc.; "Java 2 Platform SE v.1.4.2"; archival date of Apr. 5, 2003, accessed Dec. 3, 2007; Class MouseEvent.

(Continued)

*Primary Examiner*—Sara England
(74) *Attorney, Agent, or Firm*—Michael A. Glenn; Glenn Patent Group

(57) ABSTRACT

A computer implemented method for gathering user feedback of one or more units of hypermedia content. Notice is made available to a user explaining a preestablished mapping between (1) at least one prescribed aspect of an operation of performing a predefined SELECT function to feedback objects and (2) user-indicated opinion of content units. Feedback objects comprise predetermined types of display objects provided to depart content units for different content units. Responsive to a user positioning a cursor upon a feedback object of a current content unit and performing the SELECT function, user-indicated opinion of the current content unit is ascertained by applying the preestablished mapping to the prescribed aspect of how the SELECT function was performed. Storage is initiated for a machine-readable record of the ascertained user-indicated opinion.

20 Claims, 5 Drawing Sheets

OTHER PUBLICATIONS

Bravenet Web Services, Inc.; "Mini Poll Service"; archival date of Jun. 23, 2004, accessed Dec. 3, 2007 from website: http://web.archive.org/web/20040623014058/http://www.bravenet.com/webtools/minipoll/.

FunctionX, Inc.; "The Slider Control"; archival date of Oct. 5, 2003, accessed Dec. 3, 2007; MFC Controls—Static Text.

Sun Microsystems, Inc.; "Java 2 Platform SE v.1.4.2"; archival date of Apr. 5, 2003, accessed Dec. 3, 2007; Interface MouseListener.

* cited by examiner

350

400

600

METHOD AND APPARATUS FOR UTILIZING PRESCRIBED ASPECT(S) OF FEEDBACK OBJECT SELECT OPERATION TO INDICATE USER FEEDBACK OF HYPERMEDIA CONTENT UNIT

CROSS-REFERENCE TO RELATED APPLICATIONS

This application is a continuation of the following application, and claims the benefit thereof in accordance with 35 USC 120: U.S. application Ser. No. 11/186,574 entitled "METHOD AND APPARATUS FOR UTILIZING PRESCRIBED ASPECT(S) OF FEEDBACK OBJECT SELECT OPERATION TO INDICATE USER FEEDBACK OF HYPERMEDIA CONTENT UNIT," filed on Jul. 20, 2005 in the names of Hillis et al. We hereby incorporate the entirety of the foregoing application herein by reference.

BACKGROUND OF THE INVENTION

1. Field of the Invention

The invention relates to computer interfaces by which people read and navigate hypermedia documents. More particularly, the invention concerns a method and apparatus for using prescribed aspect(s) of a user's feedback object select operation to indicate the user's feedback of a hypermedia content unit.

2. Description of the Related Art

Besides the keyboard, the mouse is the tool of choice for people that work with computers. The basic functions of a computer mouse are to position a cursor on a display monitor and to select objects using one or more buttons. Through the years, hardware engineers have improved on the basic mouse by adding balls, wheels, optical mechanisms, more buttons, and variety of other gadgets. In this time, software engineers have also done their part, developing a variety of mouse functions designed to improve the man-machine interface further.

Computer mice have become important tools for users to access Internet Web pages, chiefly because most Web content includes graphics that are most conveniently accessed by mouse rather than keyboard. Technically speaking, computer mice have become integral tools for using browsers, which are software programs that allow users to view and navigate hypertext and hypermedia documents.

In the computing realm, hypertext is a user interface paradigm for displaying documents which branch or perform on request. The most frequently discussed form of hypertext document contains automated cross-references to other documents called hyperlinks. Selecting a hyperlink causes the computer to display the linked document within a very short period of time. Hypermedia is an extension of the term hypertext, in which audio, video, plain text, and non-linear hyperlinks intertwine to create a generally non-linear medium of information. The World Wide Web is a classic example of hypermedia. For purposes of the present application, hypermedia is taken to include hypertext.

Browsers operate upon hypermedia content as follows. Typically, a user instructs the browser program to present a particular content page by operating the mouse to position a cursor upon a hyperlink that represents that page, and clicking the mouse. The user can also navigate inward to content pages by clicking a "forward" button, or outward using a "back" button.

Although the foregoing well known systems enjoy widespread commercial success today, the inventors have sought to further improve the performance and utility of browsers and related systems.

SUMMARY OF THE INVENTION

Broadly, the invention concerns a computer implemented method for gathering user feedback of one or more units of hypermedia content. Notice is made available to a user explaining a preestablished mapping between (1) at least one prescribed aspect of an operation of performing a predefined SELECT function to feedback objects and (2) user-indicated opinion of content units. Feedback objects comprise predetermined types of display objects provided to depart content units for different content units. Responsive to a user positioning a cursor upon a feedback object of a current content unit and performing the SELECT function, user-indicated opinion of the current content unit is ascertained by applying the preestablished mapping to the prescribed aspect of how the SELECT function was performed. Storage is initiated for a machine-readable record of the ascertained user-indicated opinion.

DETAILED DESCRIPTION

Hardware Components & Interconnections

Computing System

Figure 1:
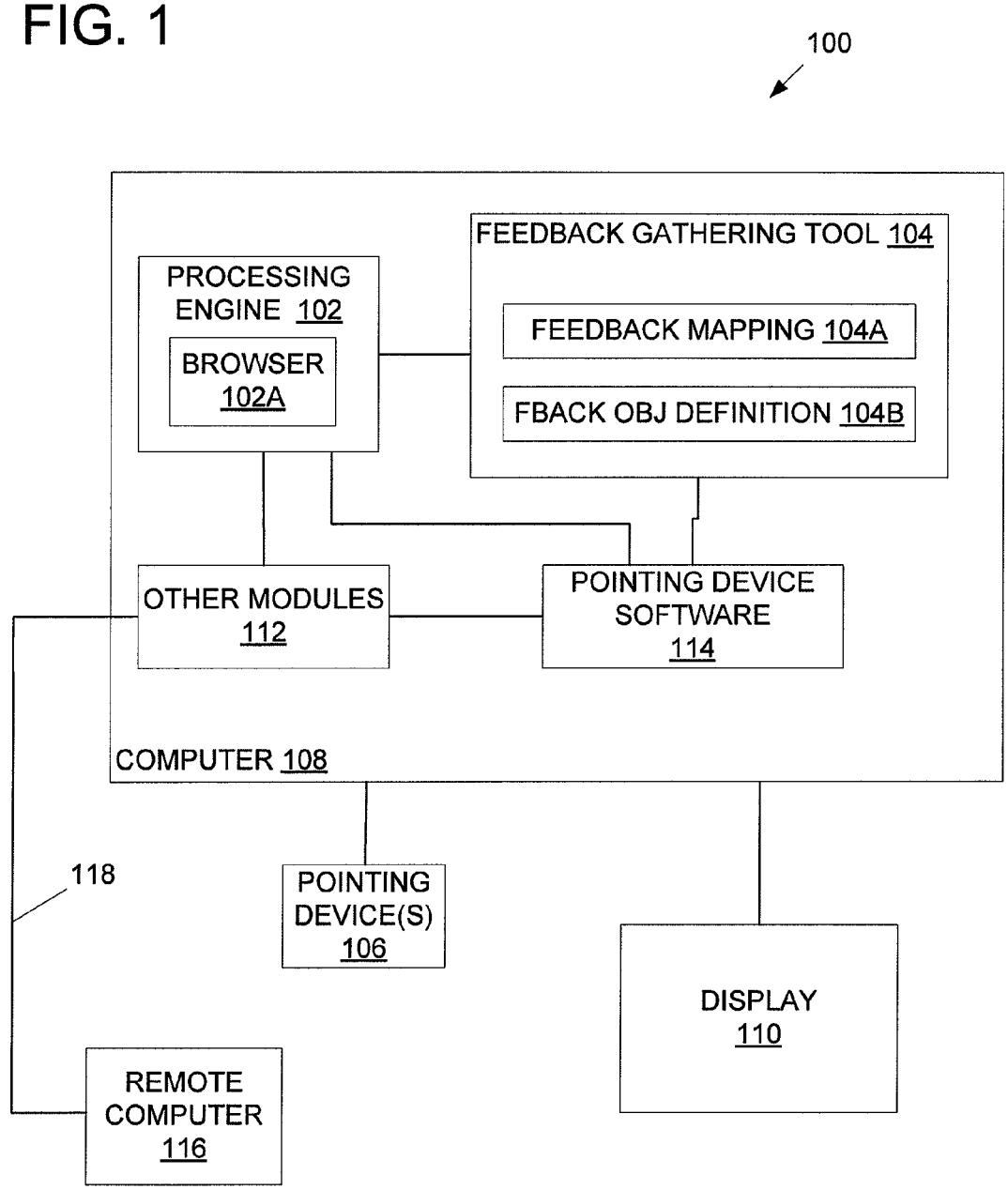
FIG. 1 is a block diagram of the hardware components and interconnections of a computing system.

One aspect of the invention concerns a computing system, which may be embodied by various hardware components and interconnections, with one example being described by the system 100 of FIG. 1. The system 100 includes a computer 108 of various subcomponents, each of which may be implemented by one or more hardware devices, software devices, a portion of one or more hardware or software devices, or a combination of the foregoing. The makeup of individual subcomponents is described in greater detail below, with reference to an exemplary digital data processing apparatus, logic circuit, and signal bearing medium.

More particularly, the computer 108 includes a processing engine 102 (including or coupled to a browser 102*a*), feedback gathering tool 104, pointing device software 114, and various other modules 112. The browser 102*a* comprises a software module configured to display various hypermedia content in human readable form. Such content includes pages, frames, documents, or other units of hypermedia content. As an example, the hypermedia content may be encoded in markup language such as HTML or another one of many existing markup languages. Without any intended limitation, pages of content may also be used to describe any of the foregoing units or sub-units of content as well as others familiar to ordinarily skilled artisans. To cite a few specific examples, the browser may comprise MICROSOFT INTERNET EXPLORER, MOZILLA FIREFOX, NETSCAPE NAVIGATOR, or another browser compatible with WINDOWS, MAC, LINUX, UNIX, or another operating system. (The foregoing terms in capital letters are trademarks of their respective owners)

The feedback gathering tool 104 comprises a software module configured to gather user feedback as to content presented by the browser 102a, as explained in greater detail below. The tool 104 may be integrated into the engine 102, or it may be a plug-in or other add-on component that operates in cooperation with the browser 102a.

The pointing device software 114 includes drivers or other programming needed to convey a two dimensional cursor position from the pointing device 106 to the engine 102, tool 104, and/or other modules 112. The pointing device software 114 also includes drivers or other programming needed to convey one or more different SELECT functions from the pointing device 106 (or another device, not shown) to the engine 102, tool 104, and/or other modules 112. Optionally, the pointing device software 114 may also include programming to provide enhanced pointing device features. Although mouse software is used to provide a tangible example, there is no intended limitation, and such software 114 as disclosed shall include software corresponding to a variety of other user input devices as listed below.

The pointing device 106 comprises a hardware device operable by a user to convey a two dimensional cursor position and at least one SELECT function to the computer 108. Although a mouse is used to provide a tangible example, a variety of other user input devices may be used to perform the same function, such as keyboard, trackball, eye gaze input system, foot pedals, joystick, voice operated cursor, etc. Furthermore, cursor motion and SELECT may be effected by one device, or separately by different devices. One specific example of a SELECT function is clicking a mouse button.

The display 110 provides a visual output of signals from the computer 108, including output images generated by the browser, for viewing by the user. Among other things, content of the display includes the browser's depiction of hypermedia content pages, and a cursor whose position is controlled by the pointing device 106. The display 110 may be embodied by a cathode ray tube (CRT), plasma screen, liquid crystal display (LCD), television screen, or any other suitable video presentation device.

The remote computer 116 is an optional component comprising a digital data processing device coupled to the computer 108 by a link 118. As explained in greater detail below, the system 100 may employ the computer 116 to store certain data instead of (or in addition to) using the computer 108 to store such data. The link 118 may use technology such as telephone, Internet, Intranet, wireless, satellite link, fiber optic, or any other apparatus for conveying digital data conveyance.

Exemplary Digital Data Processing Apparatus

As mentioned above, data processing entities such as the computer 108, computer 116, engine 102, and tool 104 may be implemented in various forms. One example is a digital data processing apparatus, as exemplified by the hardware components and interconnections of the digital data processing apparatus 200 of FIG. 2.

The apparatus 200 includes a processor 202, such as a microprocessor, personal computer, workstation, controller, microcontroller, state machine, or other processing machine, coupled to storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, flash PROM, one or more magnetic data storage disks such as a hard drive, a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204, 206, and/or 208 may be provided on-board the processor 202, or even provided externally to the apparatus 200.

Logic Circuitry

Figure 3A:
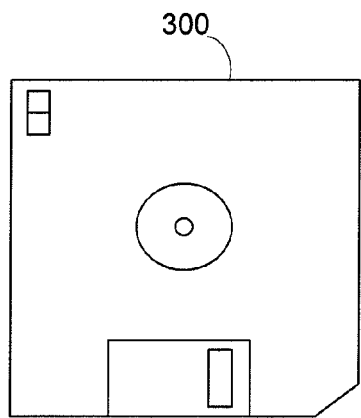
FIG. 3A shows an exemplary signal-bearing medium.
Figure 3B:
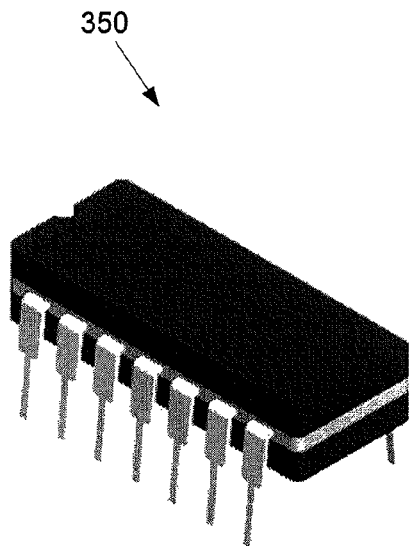
FIG. 3B shows exemplary logic circuitry.

In contrast to the digital data processing apparatus discussed above, a different embodiment of the invention uses logic circuitry instead of computer-executed instructions to implement processing entities of the system 100. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like. FIG. 3B depicts an exemplary form 350 of logic circuitry.

Operation

Having described various structural features, some operational aspects will now be described. As mentioned above, the operational aspect of the disclosure basically involves computer-implemented operations of gathering user feedback as to one or more of hypermedia content units.

One Specific Example

As an introduction to the operating sequence described below, and without any intended limitation whatsoever, an illustration is now given to concisely explain a very specific operational embodiment. The scope of the invention is not limited in any way to this particular description.

Figure 6:
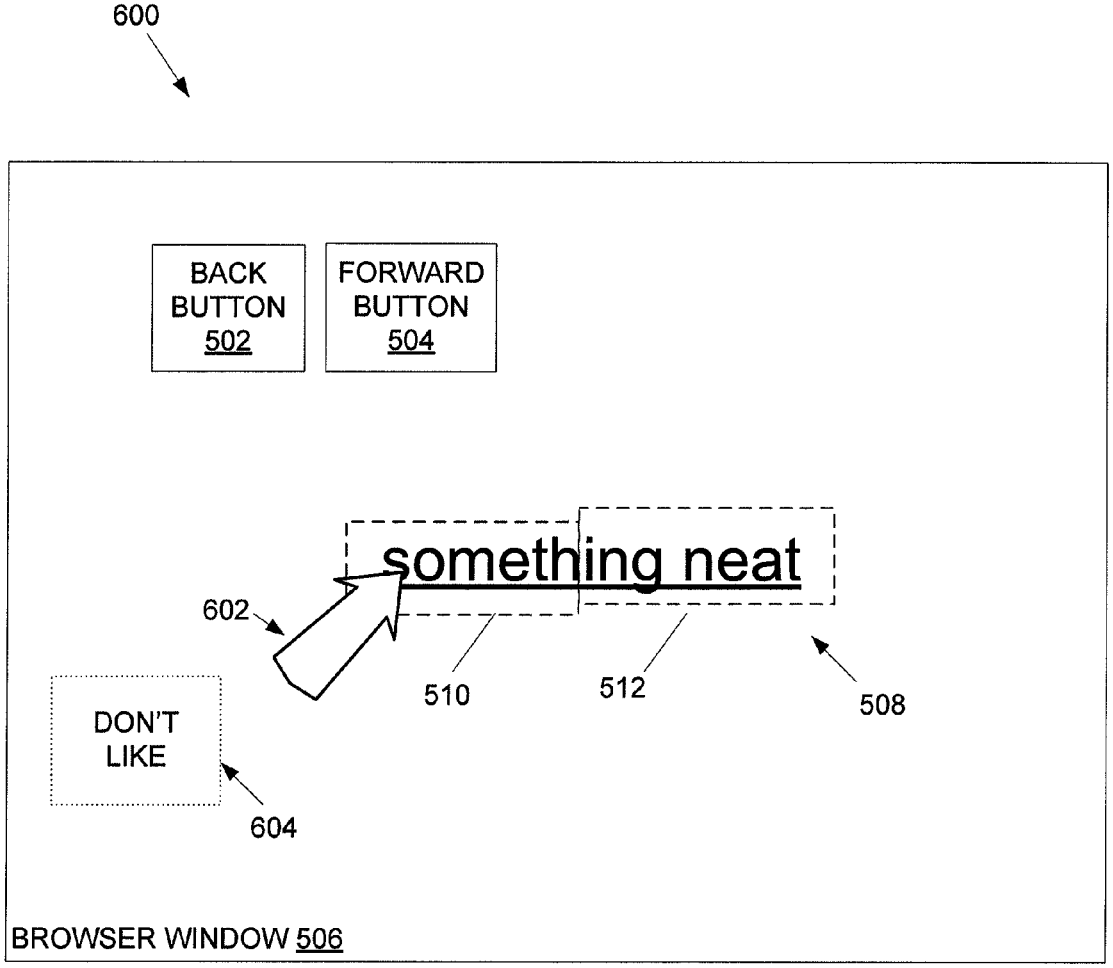
FIG. 6 is a simplified diagram illustrating components of a browser window, in a second example.

With reference to FIGS. 1 and 6, this example begins when the user is viewing a World Wide Web page upon the browser window 506. Among other content of the current web page, there is an item of hyperlinked text 508. The hyperlink 508 qualifies as a feedback object, according to the definition 104b. 102b. Whenever the user selects the hyperlink 508 by positioning the cursor 602 thereover and "clicking," the browser 102a leaves the current web page and transitions to the hyperlinked web page. At the moment of "clicking," the feedback tool 104 consults the preestablished mapping 104a in order to translate the cursor position relative to the hyperlink 508 into the user's supposed opinion of the current web site. In the example of FIG. 6, if the user selects the hyperlink in a right zone 512, the mapping indicates that the user was pleased With the current web site. Conversely, if the user selects the hyperlink in a left zone 510, the tool 104 concludes that the user was displeased with the current web site. The tool 104 stores a record of the user's opinion, either locally at the computer 108 or remotely at the computer 116.

Thus, the disclosed example permits the user to signify his opinion of the current Web page, without requiring any more mouse clicks than normal, and without requiring a cumbersome graphical user interface (GUI).

Signal-Bearing Media

Figure 2:
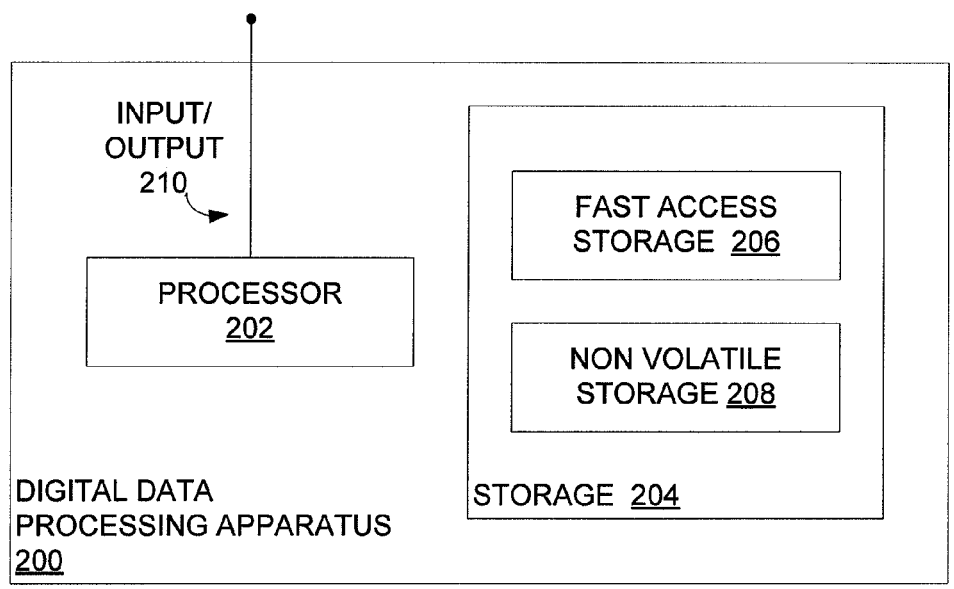
FIG. 2 is a block diagram of a digital data processing machine.

Wherever the functionality of any operational components of the disclosure is implemented using one or more machine-executed program sequences, these sequences may be embodied in various forms of signal-bearing media. In the context of FIG. 2, such a signal-bearing media may comprise, for example, the storage 204 or another signal-bearing media, such as a magnetic data storage diskette 300 (FIG. 3A), directly or indirectly accessible by a processor 202. Whether contained in the storage 206, diskette 300, or elsewhere, the instructions may be stored on a variety of machine-readable data storage media. Some examples include direct access storage, e.g. a conventional hard drive, redundant array of inexpensive disks ("RAID"), or another direct access storage device ("DASD"), serial-access storage such as magnetic or optical tape, electronic non-volatile memory, e.g. ROM, EPROM, flash PROM, or EEPROM, battery backup RAM, optical storage e.g. CD-ROM, WORM, DVD, digital optical tape, paper punch cards, or other suitable signal-bearing media including analog or digital transmission media and analog and communication links and wireless communications. In one embodiment, the machine-readable instructions may comprise software object code, compiled from a language such as assembly language, C, etc.

Logic Circuitry

In contrast to the signal-bearing medium discussed above, some or all functional components may be implemented using logic circuitry, instead of using a processor to execute instructions. Such logic circuitry is therefore configured to perform operations to carry out the method of the disclosure. The logic circuitry may be implemented using many different types of circuitry, as discussed above and exemplified by the logic circuitry 350 of FIG. 3B.

Operating Sequence

Introduction

Figure 4:
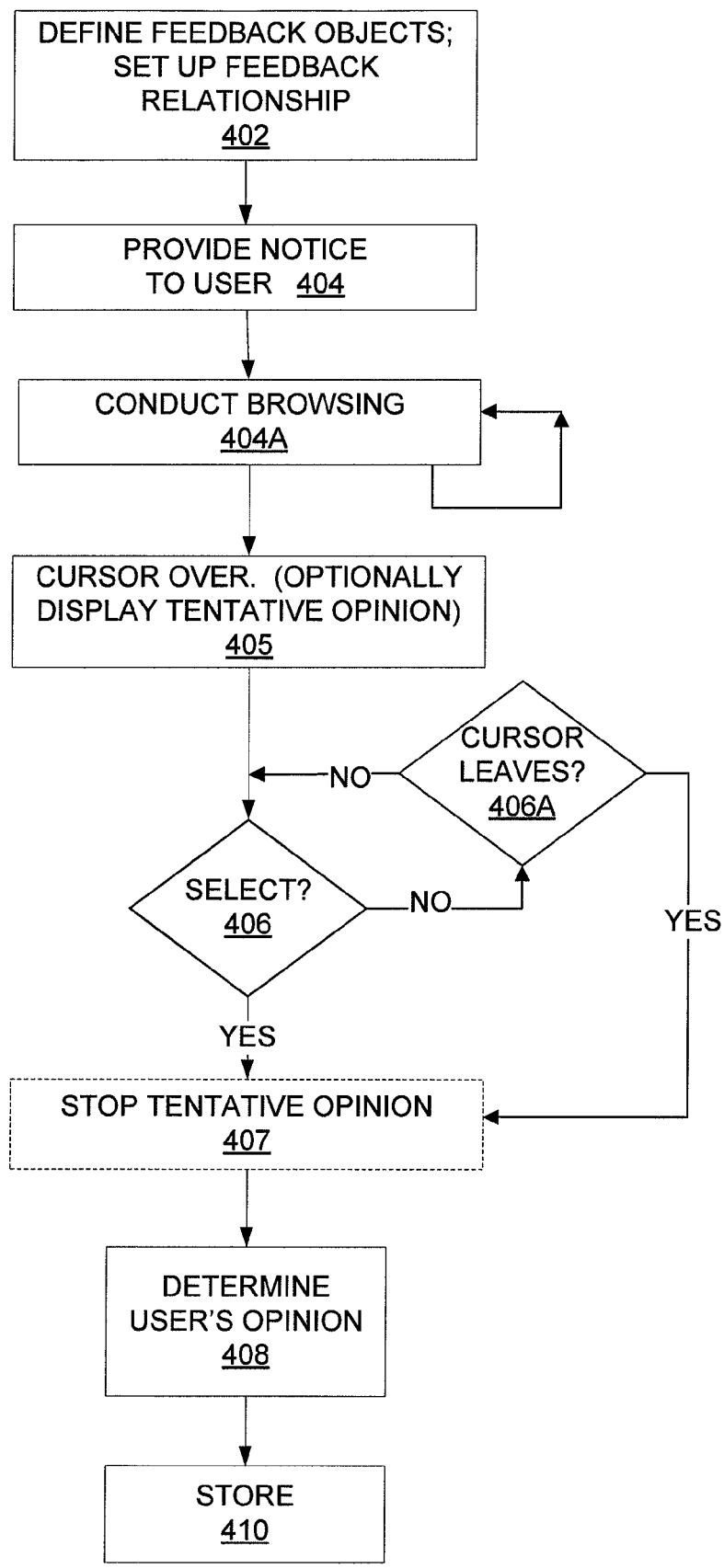
FIG. 4 is a flowchart or of an operational sequence for receiving user feedback of one or more pages of hypermedia content.

FIG. 4 shows a sequence 400 to illustrate one example of the method aspect of the invention. Broadly, this sequence performs machine-implemented operations of receiving user feedback as to one or more hypermedia content units. For ease of explanation, but without any intended limitation, the example of FIG. 4 is described in the context of the system 100 illustrated above. FIG. 4 is explained with aid of FIGS. 5-6, which display exemplary browser windows 500, 600, respectively.

Figure 5:
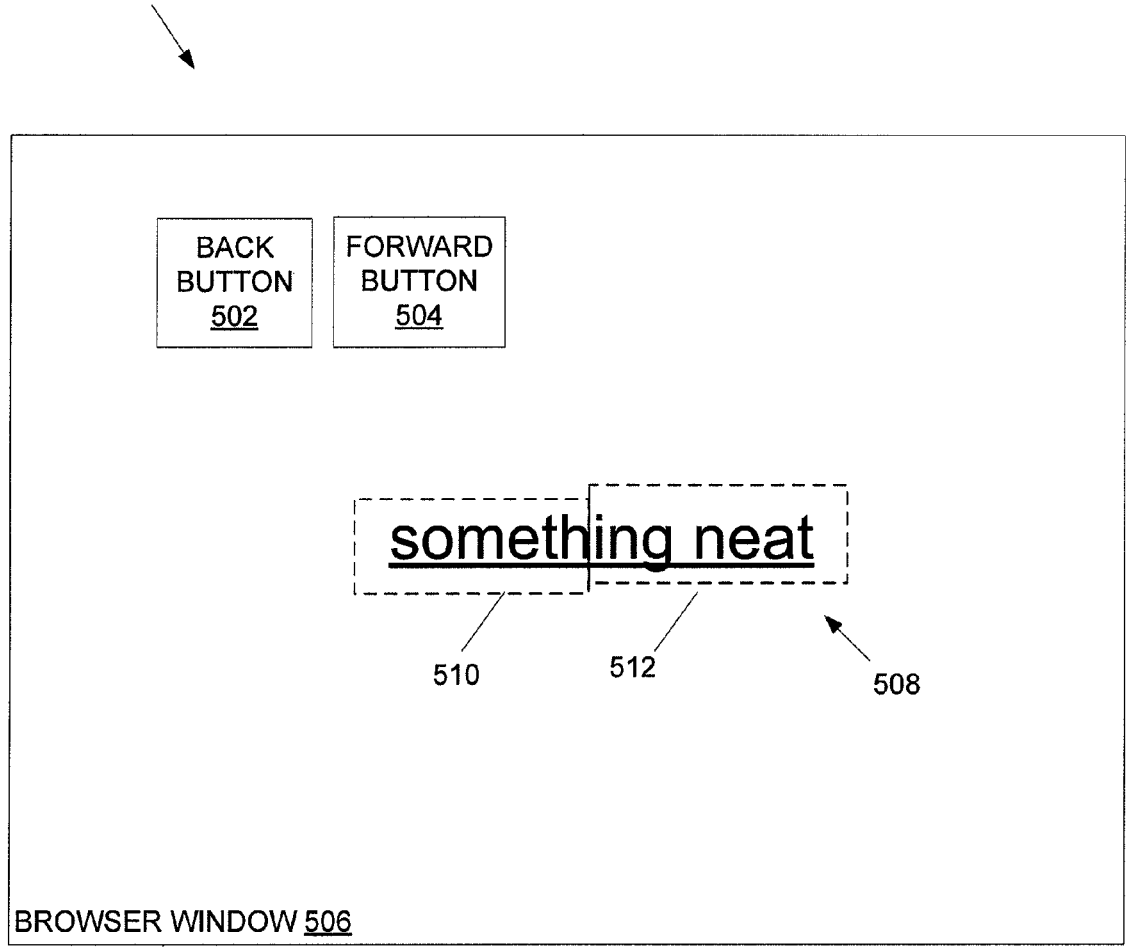
FIG. 5 is a simplified diagram illustrating components of a browser window, in a first example

By way of introduction, this disclosure discusses different examples of feedback objects and feedback mapping. Basically, the feedback objects are different items presented by the browser 102a by which the user can depart the currently displayed content page for a different page. In the example of FIG. 5, all hyperlinks (such as 508) constitute feedback objects. By selecting the hyperlink 508, for example, the user not only leaves the current page but also simultaneously indicates his/her opinion of the current page. In the present example, the user selects the hyperlink by positioning the cursor 602 over the hyperlink 508 and performing a SELECT function such as clicking one or more mouse buttons, tapping the "enter" or another keyboard key, etc.

In one embodiment, the user indicates his opinion by the location on the feedback object (hyperlink 508) at which the user executes the SELECT function. The predetermined relationship between different SELECT positions and their corresponding meaning (user opinion) is the feedback mapping. In the present example, the user SELECTS a left region 510 of the hyperlink 508 to signify that the user did not like the current page. Conversely, the user SELECTS a right region 512 to indicate a positive opinion. The left and right regions 510, 512 can but need not be marked anywhere. Under other embodiments, the user's opinion is indicated by other aspects of the SELECT operation than cursor position.

Defining Feedback Objects, Feedback Mapping

Broadly, step 402 defines types of feedback objects (104b) and establishes a feedback mapping 104a. In one example, these features are built-in to the feedback gathering tool 104, so they are defined when the tool 104 is installed designed, updated, installed, re-booted, or otherwise configured. In a different embodiment, the types of feedback objects 104b and feedback mapping 104a are established in whole or part by user input.

In the example given above, hyperlinks (such as 508) constitute one type of feedback object. In another example, the browser's back button 502 and forward button 504 also constitute feedback objects. As another example, hyperlinked regions, images, graphics, or other imagery may be defined as feedback objects. Feedback objects may also be defined to include radio buttons, check boxes, and the like. Furthermore, feedback objects may include menu items (such as pull-down menus), with two examples including a web browser's "Back" and "Forward" pull-down menu entries. Feedback objects may include virtually any subset of the display or browser window.

In one example, the tool 104 interprets SELECTION of different regions of the button 502 or 504 as different user opinions. In the example given above, the feedback mapping 104a specifies that each feedback object's left region (such as 510) indicates the user's negative opinion, and the right region (such as 512) indicates a positive opinion. Similarly, when the user SELECTS a left (or right) region of the button 502 or 504, the tool 104 interprets this as a negative (or positive) opinion. In a different example, the feedback mapping 104a accommodates more than two opinions (such as four), and each feedback object has a corresponding number of regions (in this example four). In still another example, the tool 104 senses user opinion on a continuum, such as rating the current content page on a scale of zero to ten, or zero to one hundred, or zero to a greater number as fine-grained as possible considering the limitations of the display screen resolution and mouse performance. In this case, the feedback mapping 104a specifies that user SELECTION of a feedback object at its rightmost point indicates one hundred, and SELECTING the object at its left most point indicates zero or minus one hundred. Furthermore, instead of using right/left, the feedback mapping 104a may specify a top/bottom distinction, where SELECTIONS toward the top of feedback objects indicate positive opinions, and SELECTIONS toward the bottom of feedback objects indicate negative opinions.

In still another example, different feedback mappings may be used for different types of feedback objects. For example, hyperlinks may use a left/right continuum, whereas the back and forward buttons 502, 504 use two distinct regions of "up" and "down."

In a different embodiment, instead of mapping different cursor positions to different user opinions, feedback mapping may consider a different aspect of the SELECT operation entirely. For example, the feedback mapping may specify different durations of SELECT mapped to different user opinions. For example, a longer SELECT, e.g. mouse click, may indicate greater satisfaction with the current URL or greater curiosity about the linked URL. This variation may be advantageous for limited mobility computer users who experience difficulty controlling the click location with precision, but can more easily control click duration.

In still another embodiment, feedback mapping may consider still another different aspect of the SELECT operation. Namely, user opinion may be indicated by the particular mouse button used to perform the SELECT operation. For example, a left click may indicate a positive user feedback, while a right click indicates negative user feedback.

Providing Notice

Step 404 provides notice available to the user explaining the feedback mapping 104a and the types of feedback objects 104b. Step 404 may be carried out in various ways. For example, computer 108 may provide an on-demand help screen, offline help file, read-me.txt file, or other notice that makes a suitable explanation. In this example, the computer 108 makes notice available to the user, but does not necessarily provide notice to the user (because the user might not ask for it). As another example, the computer 108 may present a splash or other advisory screen whenever the browser 102a is started. As another example, the computer 108 may display an explanatory mouse-over box that selectively appears whenever the user positions the cursor 602 over anything recognized as a feedback object. In contrast to performing step 404 as disclosed, notice may be provided by the optional step 405 as discussed below.

Commencing Browsing

In step 404a, the browser 102a begins to operate, presenting human-readable output pages of content from a hypermedia source, responsive to user direction through user entry of uniform resource locators (URLs) or other addresses, selecting back/forward buttons 502/504, or making other customary browser inputs. The encoded source may comprise an Internet web page, Intranet web page, locally stored document, or other hypermedia source. Optionally, the hypermedia source may employ a markup language such as HTML, SGML, XML, or another markup language. The operation 404a repeats continually as long as the browser 102a is active.

Cursor Over; Displaying Tentative Opinion

In step 405, the browser determines that the cursor has moved over a feedback object, as defined by 104b. At this point, step 405 may also provide an optional enhancement to the presentation of the content by the browser 102a. This embodiment is implemented in the case where cursor position is the aspect of the SELECT function used to indicate user opinion. This enhancement is not used, for example, where SELECT duration is used to indicate user opinion.

In the optional enhancement to step 405, the browser 102a and tool 104 cooperatively display a tentative user opinion whenever the cursor 602 is positioned over a feedback object (such as hyperlink 508) prior to user activation of the SELECT function. In one embodiment, the foregoing feature may additionally constitute the notice specified by step 404, i.e., they are one in the same; alternatively, notice may be given separately of this feature.

More particularly, whenever components 102a/104 determine when the cursor 602 is positioned over a feedback object, the tool 104 responds by utilizing the feedback mapping 104a to translate cursor position into the corresponding user opinion. The tool 104 then instructs the browser 102a to provide a continually updated display 604 of user-indicated opinion corresponding to the current cursor position. This aids the user by indicating what his opinion would be, were s/he to perform a SELECT action at that cursor position.

In the present example, the displayed tentative user opinion 604 (FIG. 6) indicates that, should the user perform a SELECT, then s/he would enter a negative opinion of the current content page.

Receiving User's SELECT

With the cursor lying over a feedback object (step 405), the tool 104 in step 406 determines whether the user has performed a SELECT function upon any feedback object of the current page. In one example, step 406 involves the browser 102a using information supplied by the pointing device software 114 to recognize when the user has positioned the cursor 602 over a feedback object (such as the hyperlink 508) and performed a SELECT function such as clicking one or more mouse buttons, tapping the "enter" or another keyboard key, etc. The browser 102a also uses information supplied by the pointing device software 114 to recognize the cursor position upon the feedback object at the moment of the SELECT action. The browser 102a provides the tool 104 with a representative signal advising the tool 104 that the user has SELECTED a feedback object. The browser 102a also provides the tool 104 with a representative signal advising the tool 104 of the prescribed aspects of the user's SELECT action, such as (1) the position upon the object 508 where SELECTION was made, (2) the duration of the SELECT action, (2) the mouse button used to SELECT, or another indication of user opinion not necessarily related to position within the feedback object.

Discontinuing Tentative Opinion

As a counterpart to step 405, step 406a determines whether the cursor has left the current feedback object. If the cursor is still over the feedback object, step 406 continues to examine whether a SELECT has occurred. On the other hand, if the cursor has left the current feedback object, then step 407 discontinues the tentative opinion display (such as 604) that began in step 405. At this point, the display 604 is removed because it is no longer relevant; the user has moved the cursor elsewhere.

Similarly, when step 406 finds that a SELECT has occurred (in the optional embodiment employing the tentative opinion feature), then step 407 discontinues the tentative opinion display responsive to the SELECT. At this point, the display 604 is removed because the opinion is no longer tentative, since the browser is transitioning to the newly selected content page.

Step 407 is omitted for implementations of the routine 400 where user opinion is indicated by a non-positional aspect of the SELECT action, such as mouse click duration, mouse button choice, etc.

Determine User's Opinion

Responsive notice from step 406 that the user positioned the cursor upon a feedback object and activated a SELECT function, the tool 104 then proceeds to determine the user-indicated opinion signified by the SELECT action (step 408). Namely, the tool 104 applies the feedback mapping 104a to the designated aspect of the SELECT function, e.g. cursor position within the feedback object at the moment of SELECT, mouse click duration, mouse button choice, etc. In other words, the feedback mapping 104a is used to map the designated characteristic of the SELECT function into a representative user opinion.

The routine 400 correlates the user's opinion with a particular content unit of the hypermedia source. The type of content unit depends upon the manner in which the routine 400 is implemented, which may occur in different embodiments. For example, when determining the user's opinion (step 408), the tool 104 may be programmed to associate that opinion with one of the following content units: (1) the current page, namely, the page of hypermedia content containing the feedback object SELECTED by the user, (2) the entire hypermedia document, or a logical or functional subset of pages including the current page that contains the feedback object SELECTED by the user, (3) the entire Internet or Intranet web site containing the source page with the user-selected feedback object, (4) a subset of the Internet or Intranet web site containing the user-selected feedback object, such as a subset of the web site relating to a particular subject matter, or (5) another unit.

Thus, the user's SELECT operation may convey the user's sentiment about the current hypermedia page as the user leaves that page, or a more generalized sentiment concerning some or all of the hypermedia source document regardless of whether the user is leaving or entering a particular hypermedia page. In the illustrated embodiment, without any limitation, the significance of the user's SELECT operation is preset, e.g. fixedly associated with one particular class of content unit, depending upon how the routine 400 is written and installed.

Storing a Record

Step 410 initiates storage of the user opinion obtained from step 408. For instance, the engine 102 may transmit an instruction to write the user opinion to storage, or the engine 102 may perform the storage itself.

Storage may occur locally at the computer 108, remotely at another computer 116, or at another site. Step 410 is performed by the tool 104, the engine 102, browser 102*a*, another module 112, or a combination of the foregoing. Storage may be conducted in the form of any machine readable record such as ASCII file, binary file, memory address, sector, XML file, document, memory register, page, linked list, relational database, or any other desired data structure or physical storage construct.

Other Embodiments

While the foregoing disclosure shows a number of illustrative embodiments, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

In addition, those of ordinary skill in the relevant art will understand that information and signals may be represented using a variety of different technologies and techniques. For example, any data, instructions, commands, information, signals, bits, symbols, and chips referenced herein may be represented by voltages, currents, electromagnetic waves, magnetic fields or particles, optical fields or particles, other items, or a combination of the foregoing.

Moreover, ordinarily skilled artisans will appreciate that any illustrative logical blocks, modules, circuits, and process steps described herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g. a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. A hypermedia browsing apparatus, comprising:
 a display;
 a user input apparatus;
 digital data storage containing data establishing at least one hypermedia navigation action type, and associating each hypermedia navigation action type with multiple different prescribed user inputs performable with the user input apparatus; and
 a computer coupled to the display and the user input apparatus and the storage, the computer programmed to perform operations to resolve a user's opinion as to hypermedia content presented on the display, the operations comprising:
  via the display, presenting hypermedia content from a remote website;
  responsive to occurrence of any of the prescribed user inputs associated with a particular one of the hypermedia navigation action types to execute a given hypermedia navigation action of said particular type, conducting the given hypermedia navigation action without regard to which of the prescribed user inputs occurred;

independent of the given hypermedia navigation action, distinguishing as to which of the prescribed user inputs occurred in order to locally determine a user opinion of presented hypermedia content, withholding the determined user opinion from the remote website; and initiating storage of a machine-readable record of the determined opinion.

2. One or more non-transitory computer readable storage media containing a program of machine-readable instructions executable by a digital data processor to perform hypermedia browsing operations in a system that includes a display, a user input apparatus, and digital data storage, the operations comprising:

in the digital data storage, storing data establishing at least one hypermedia navigation action type, and associating each hypermedia navigation action type with multiple different prescribed user inputs performable with the user input apparatus;

performing operations to resolve a user's opinion as to hypermedia content presented on the display, the operations comprising:

via the display, presenting hypermedia content from a remote website;

responsive to occurrence of any of the prescribed user inputs associated with a particular one of the hypermedia navigation action types to execute a given hypermedia navigation action of said particular type, conducting the given hypermedia navigation action without regard to which of the prescribed user inputs occurred;

independent of the execution of the hypermedia navigation action, distinguishing as to which of the prescribed user inputs occurred in order to locally determine a user opinion of presented hypermedia content, withholding the determined user opinion from the remote website; and initiating storage of a machine-readable record of the determined opinion.

3. One or more non-transitory computer readable storage media containing a program transitory program of machine-readable instructions executable by a digital data processor to install the program of claim 2 on a computer.

4. One or more non-transitory computer readable storage media containing a program of machine-readable instructions executable by a digital data processor to modify an existing web browser program on a computer to include the program of claim 2.

5. A method for computer-implemented hypermedia browsing implemented in a system including a display, a user input apparatus, digital data storage, and a computer, the method comprising operations of:

in the digital data storage, storing data establishing at least one hypermedia navigation action type, and associating each hypermedia navigation action type with multiple different prescribed user inputs performable with the user input apparatus;

the computer performing operations to resolve a user's opinion as to hypermedia content presented on the display, the operations comprising:

via the display, presenting hypermedia content from a remote website;

responsive to occurrence of any of the prescribed user inputs associated with a particular one of the hypermedia navigation action types to execute a given hypermedia navigation action of said particular type, conducting the given hypermedia navigation action without regard to which of the prescribed user inputs occurred;

independent of the execution of the hypermedia navigation action, distinguishing as to which of the prescribed user inputs occurred in order to locally determine a user opinion of presented hypermedia content, withholding the determined user opinion from the remote website; and initiating storage of a machine-readable record of the determined opinion.

6. The invention of any of claim 1, 2, 3, 4, or 5, where the user's opinion is unsolicited by the remote website.

7. The invention of any of claim 1, 2, 3, 4, or 5, where the prescribed user inputs include any of (1) pressing different buttons of the user input device, (2) different durations of pressing of one or more buttons of the user input device.

8. The invention any of claim 1, 2, 3, 4, or 5:

where the operations further include pre-establishing different regions of hypermedia navigation objects presented by the hypermedia browsing system; and where the pre-established different regions are free from any visible features distinguishing the regions from each other; and where the different prescribed user inputs include clicking on different ones of the preestablished regions of hypermedia navigation objects presented on the display.

9. The invention of any of claim 1, 2, 3, 4, or 5:

where the operations further include storing data in the data storage associating each different prescribed user input with a different user opinion;

where the operation of distinguishing as to which of the prescribed user inputs occurred in order to locally determine a user opinion of presented hypermedia content comprises using data stored in the data storage device to identify the user opinion associated with the prescribed user input that occurred.

10. The invention of any of claim 1, 2, 3, 4, or 5, where the operation responsive to occurrence of any of the prescribed user inputs associated with a particular one of the hypermedia navigation action types to execute a given hypermedia navigation action of said particular type, conducting the given hypermedia navigation action without regard to which of the prescribed user inputs occurred comprises:

responsive to occurrence of a first one the prescribed user inputs associated with a particular one of the hypermedia navigation action types to execute a given hypermedia navigation action of said particular type, conducting the given hypermedia navigation action;

responsive to occurrence of a second one the prescribed user inputs associated with a particular one of the hypermedia navigation action types to execute the given hypermedia navigation action of said particular type, where the second prescribed user input is different from the first prescribed user input, conducting the given hypermedia navigation action.

11. The invention of any of claim 1, 2, 3, 4, or 5, where the prescribed user inputs include a first duration of pressing one or more buttons of the user input apparatus indicating a first user opinion of hypermedia content and a second duration of pressing one or more buttons of the user input apparatus indicating a second user opinion of hypermedia content different than the first user opinion.

12. The invention of any of claim 1, 2, 3, 4, or 5, where the prescribed user inputs include pressing a first user input device button indicating a first user opinion, and pressing of a second user input device button indicating a second user opinion different than the first user opinion.

13. The invention of any of claim 1, 2, 3, 4, or 5, where the user opinion comprises user-indicated curiosity as to hypermedia content linked by the given hypermedia navigation object.

14. The invention of any of claim 1, 2, 3, 4, or 5, where the operation of determining a user opinion of presented hypermedia content includes determining a user opinion of hypermedia content comprising any one or more of:
  a page of hypermedia content;
  a hypermedia document containing multiple hypermedia pages;
  an Internet Web site;
  a subset of an Internet Web page including multiple Web pages.

15. The invention of any of claim 1, 2, 3, 4, or 5, where the at least one hypermedia navigation action type comprises activating any of:
  a web browser "back" button;
  a web browser "forward" button;
  a prescribed pull-down menu entry;
  a radio button;
  a check box;
  a hyperlinked image;
  hyperlinked text.

16. The invention of any of claim 1, 2, 3, 4, or 5, further comprising providing notice available to a user explaining the association between the at least one hypermedia navigation action type and the prescribed user inputs by performing one or more of the following:
  providing an explanation in a browser help file;
  providing an on-demand help window;
  displaying the notice in any of: a toolbar, a status bar;
  posting an advisory upon browser startup.

17. The invention of any of claim 1, 2, 3, 4, or 5, where the operation of initiating storage comprises any of:
  storing the record locally upon the digital data storage;
  transmitting the record to a remote computer.

18. The invention of any of claim 1, 2, 3, 4, or 5, further comprising operations of: receiving instructions from the user defining or enhancing or expanding the association between hypermedia navigation action types and user inputs.

19. The invention of any of claim 1, 2, 3, 4, or 5, further comprising operations of: receiving instructions from the user defining or enhancing or establishing additional ones of: hypermedia navigation action types, prescribed user inputs.

20. The invention of any of claim 1, 2, 3, 4, or 5, where the operations include universally employing the association between hypermedia navigation action types with different prescribed user inputs across different sources of hypermedia content independent of hypermedia content and other information received from sources of said hypermedia content.

* * * * *